United States Patent
Fehrenbacher et al.

[11] Patent Number: 6,013,966
[45] Date of Patent: Jan. 11, 2000

[54] MINI-FAN UNIT ESPECIALLY FOR USE AS A FUN PRINTED CIRCUIT BOARDS

[75] Inventors: Wolfgang Fehrenbacher, St. Georgen; Mojtabe Moini, Königsfeld; Fritz Schmider, Hornberg, all of Germany

[73] Assignee: Papst-Motoren GmbH & Co. KG, Germany

[21] Appl. No.: 09/169,672

[22] Filed: Oct. 9, 1998

[30] Foreign Application Priority Data

Oct. 11, 1997 [DE] Germany ............... 297 18 082 U

[51] Int. Cl.⁷ .................................. H02K 1/12
[52] U.S. Cl. ........................... 310/257; 310/156
[58] Field of Search ............. 310/257, 70, 164, 310/71, 49 A, 40 MM, 43, 62, 156

[56] References Cited

U.S. PATENT DOCUMENTS

| | | | |
|---|---|---|---|
| 3,840,761 | 10/1974 | Muller | 310/49 R |
| 4,169,990 | 10/1979 | Lerdman | 318/138 |
| 4,682,065 | 7/1987 | English et al. | 310/90 |
| 4,698,542 | 10/1987 | Muller | 310/67 R |
| 4,779,165 | 10/1988 | Elaesser et al. | 360/97.02 |
| 4,891,567 | 1/1990 | Fujitani et al. | 318/254 |
| 5,097,170 | 3/1992 | Baines | 310/268 |
| 5,176,509 | 1/1993 | Schmider et al. | 417/423 |
| 5,298,820 | 3/1994 | Lee etla. | 310/40 MM |
| 5,343,104 | 8/1994 | Takahashi et al. | 310/90 |
| 5,591,017 | 1/1997 | Dwyer | 417/360 |
| 5,782,652 | 7/1998 | Feher et al. | 439/417 |

FOREIGN PATENT DOCUMENTS

| | | |
|---|---|---|
| 0299512 | 1/1989 | European Pat. Off. . |
| 2533085 | 3/1984 | France . |
| 3821557 | 10/1989 | Germany . |
| 91009529 | 7/1991 | Germany . |
| 29501695 | 7/1995 | Germany . |
| 08214524 | 8/1996 | Japan . |

*Primary Examiner*—Nestor Ramirez
*Assistant Examiner*—Joseph Waks
*Attorney, Agent, or Firm*—Robert W. Becker & Associates

[57] ABSTRACT

A mini-fan unit for cooling a printed circuit board has a collectorless dc motor and a fan wheel driven by the dc motor. The dc motor is a single phase, single core claw pole motor having a back iron free permanent magnet rotor. At least one positioning magnet defines the starting position of the dc motor.

24 Claims, 9 Drawing Sheets

MINI-FAN UNIT ESPECIALLY FOR USE AS A FUN PRINTED CIRCUIT BOARDS

BACKGROUND OF THE INVENTION

The present invention relates to a mini-fan unit comprising a fan wheel driven by a dc motor without collector, such fan unit especially directly mounted on a printed circuit board.

Such fan units are, for example, known from German Gebrauchsmuster 295 01 695.7. The drive motor is a disk armature motor comprising an annular permanent magnetic rotor. The rotor is axially displaced relative to the stator and is arranged parallel thereto so that a planar air gap is formed between the permanent magnet and a coaxially arranged annular stator coil. The stator comprises an annular ferromagnetic plate as a magnetic ground element (back iron) for the rotor magnet. A further ferromagnetic back iron disk can be connected to the rotor itself. In this context, a ferromagnetic auxiliary arrangement for producing a magnetic auxiliary moment in cooperation with the rotor magnet is required.

The present invention therefore has the object to provide a mini-fan unit of the aforementioned kind which is especially simple, compact, and inexpensive.

SUMMARY OF THE INVENTION

Inventively, the aforementioned object is achieved by providing a dc motor in the form of a single phase, single core claw pole motor with a permanent magnet rotor without back iron, whereby at least one positioning magnet, providing the starting position of the rotor, is provided.

According to the present invention, a magnetic rotor ground (back iron) is therefore eliminated. This results in a somewhat reduced efficiency which, however, is sufficient for the preferred use. In regard to starting the motor, a starting position of the rotor is provided by having at least one, preferably two diametrically opposed, positioning magnets. Such permanent magnets are very inexpensive. The cooperation between the main magnetic field and the positioning magnet field is possible by the inventive elimination of the back iron.

Furthermore, with regard to the operational state of the motor, a very simple and very inexpensive control can be used. For this purpose, the stator has an annular coil that is coaxial to the axis of rotation and has two axially opposed claw pole plates with respectively two claw poles. The claw poles, relative to the corresponding claw pole plate, extend in the axial direction so that they are positioned radially adjacent to the annular coil. The claw pole plates are displaced relative to one another in the circumferential direction such that the claw poles of the two plates alternate in the circumferential direction. Thus, the claw poles in the circumferential direction provide neighboring north and south poles. Advantageously, in a manner known to a person skilled in the art, the annular coil is bifilar and comprises a working coil and a sensor coil. The rotor magnet induces signals in the sensor coil which signals provide information in regard to the rotor position. These signals are employed by the control unit to control the working coil by monopulsing, i.e., the working coil is alternatingly switched on and off. Thus, purposely, no magnetic alternating field is generated so that a full bridge control is not required. The control unit is thus inexpensive and will cost at most as much as a Hall integrated circuit (IC).

The inventive claw pole motor can be embodied, in comparison to a disk armature motor of the same output, in a more compact manner, especially with a smaller outer diameter.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 13.

In the different figures of the drawing the same parts are always indicated with the same reference numerals and are therefor described only once.

Figure 1:
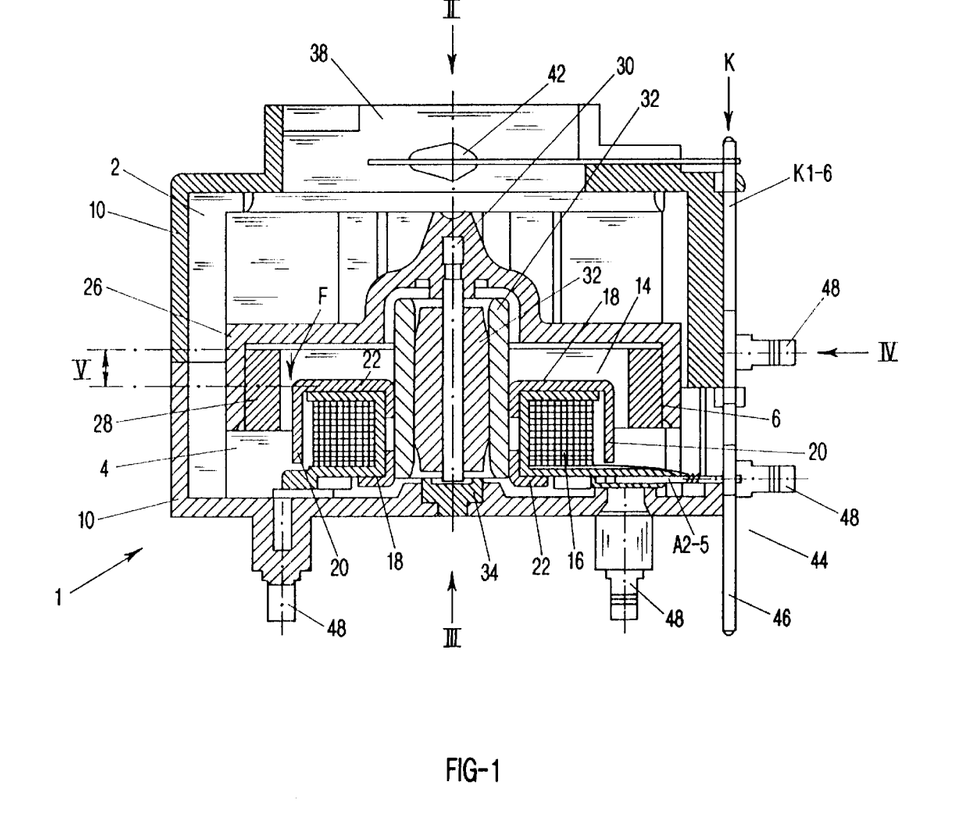
FIG. 1 is an axial section of a first embodiment of the inventive mini-fan unit.
Figure 1A:
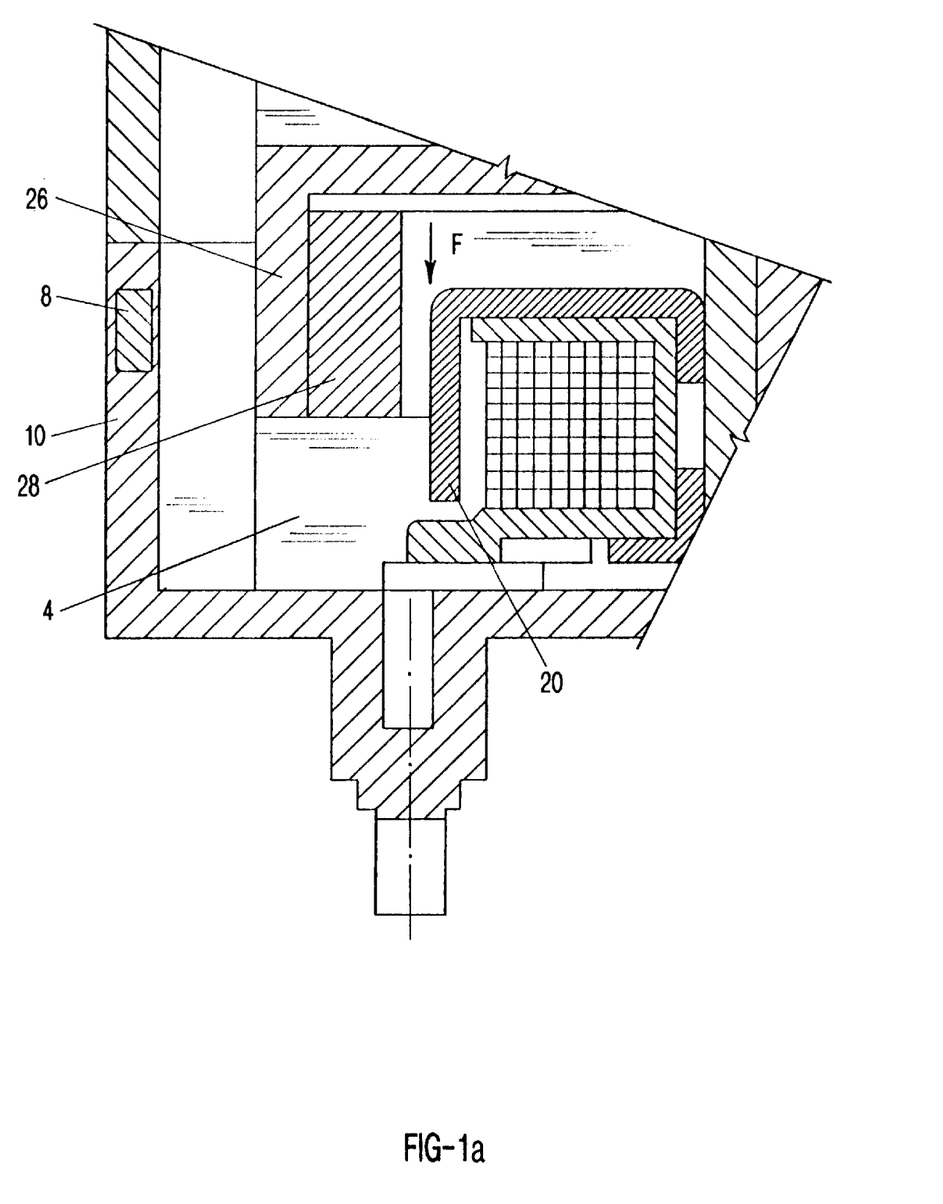
FIG. 1a shows a detail of the housing with a positioning magnet centrally arranged relative to the axial height of the rotor magnet.
Figure 11:
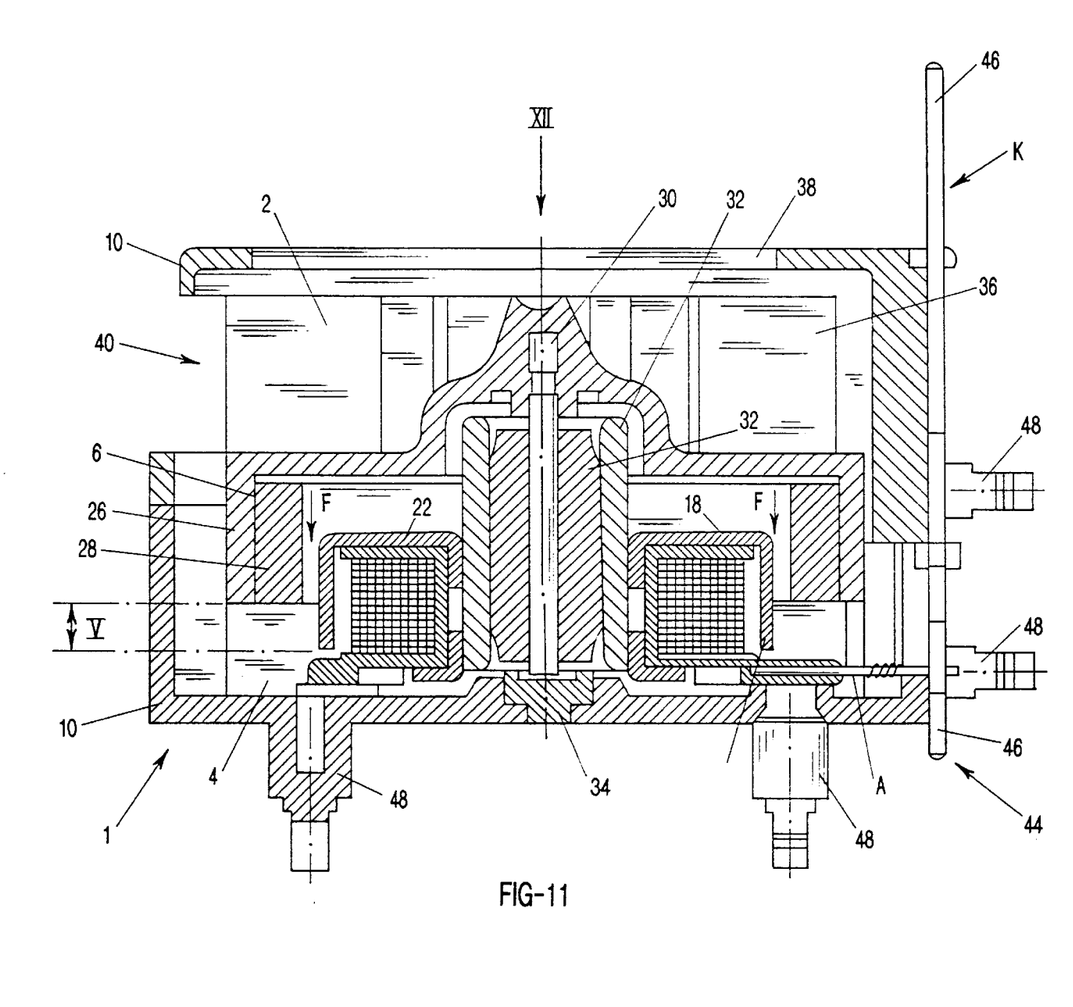
FIG. 11 is a second embodiment of the inventive mini-fan unit in a sectional view in analogy to FIG. 1.

As can be seen from FIGS. 1 and 11, the inventive mini-fan unit 1 comprises a fan wheel 2 driven by a dc motor 4 having no collector. This dc motor 4 is inventively a single phase, single core claw pole motor with a permanent magnet rotor 6 without back iron. According to FIG. 3, two diametrically opposed positioning magnets 8 are provided which in a standstill position of the dc motor 4 act on the rotor 6 such that a starting position of the rotor 6 is always provided. The mini-fan unit 1 comprises a housing 10. The positioning magnets 8 are received in pocket-like receiving elements 12 of the housing 10 so that they are positioned radially externally to the rotor 6 within the substantially axially extending reach of the rotor 6. Preferably, each one of these positioning magnets 8 is positioned relatively exactly in the center of the axial length of the rotor 6. Thus, axial oscillation excitation and the resulting annoying noise are avoided.

As can be seen furthermore from FIG. 1 as well as FIG. 5 through 8, the inventive claw pole motor 4 has a stator 14 with a coaxial toroidal coil 16 and two axially opposed claw pole plates 18. According to FIG. 6 and 8, each one of the claw pole plates 18 has preferably two diametrically opposed claw poles 20. Each claw pole extends, starting at the annular disk-shaped plate section 22 arranged at the respective end face of the annular coil 16, in the axial direction and has an arc-shaped contour in the circumferential direction so that each claw pole 20 is positioned radially adjacent to the annular coil 16 and covers thus the entire axial stator length. The two substantially identically embodied claw pole plates 18 are positioned on the axially opposed end faces of the annular coil 16 and are displaced in the circumferential direction relative to one another by 90° so that the claw poles 20 of the two claw pole plates 18 alternate in the circumferential direction. Thus, when current is supplied, the annular coil 16 generates alternating magnetic north and south poles in the circumferential direction.

Figure 14:
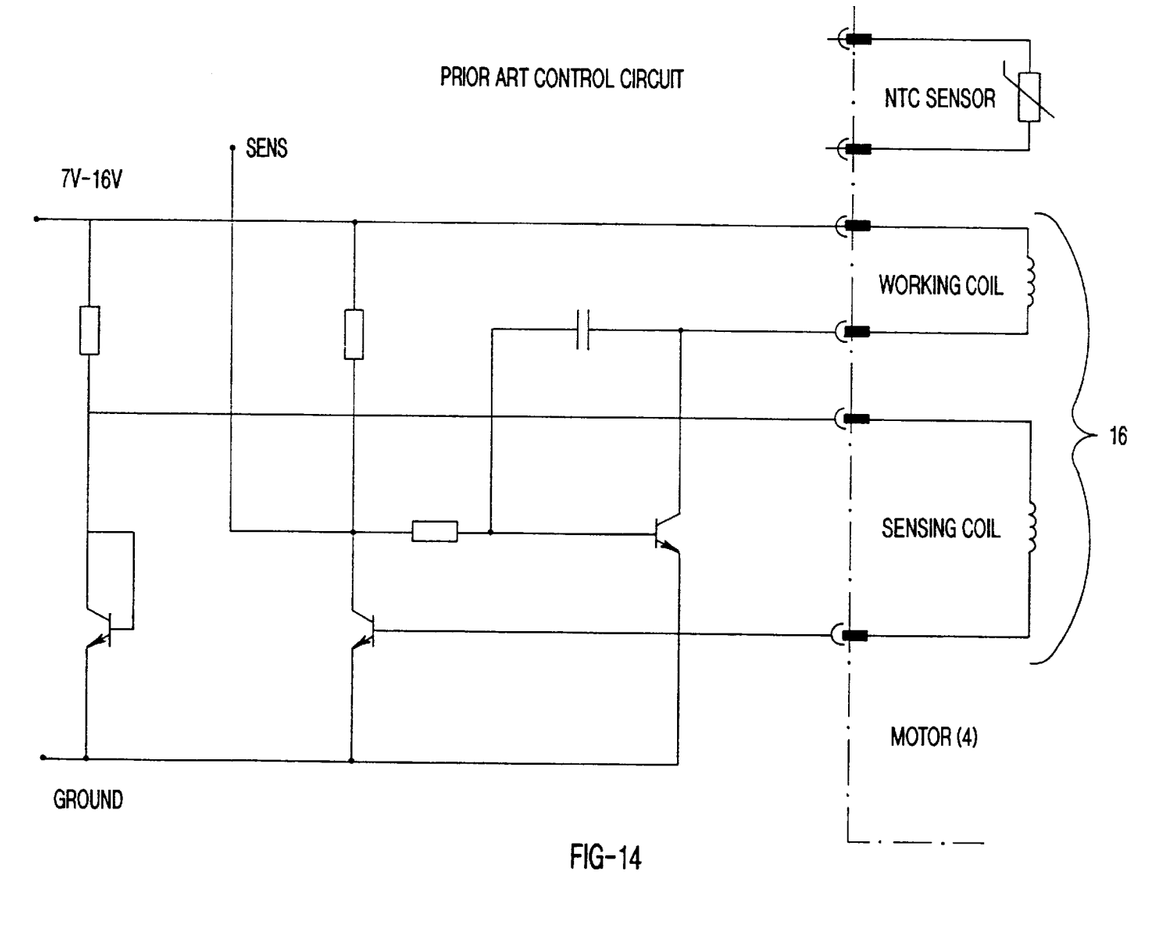
FIG. 14 shows a prior art control circuit to be used in connection with controlling the stator.

The annular coil 16 is preferably bifilar so that, on the one hand, a working coil and, on the other hand, a sensor coil is formed. Accordingly, a very simple and extremely inexpensive circuit can be used as a motor control see FIG. 14 for a conventional control circuit of the prior art to be used in this context that controls the working coil by mono-pulsing (switching on and switching off) as a function of rotor position-induced signals of the sensor coil.

Figure 6:
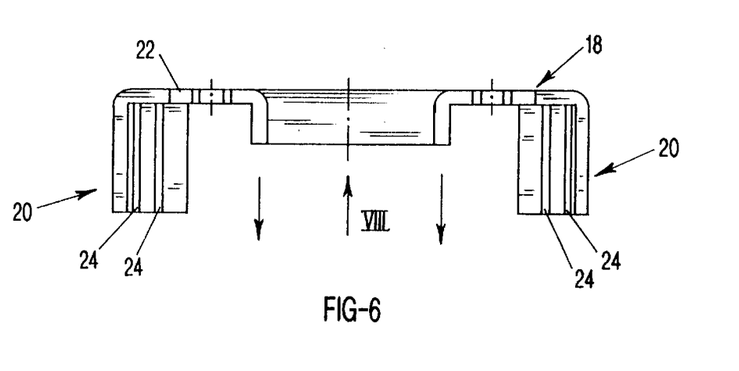
FIG. 6 is a corresponding section of a claw pole plate in correct position for mounting relative to the stator coil according to FIG. 5.
Figure 7:
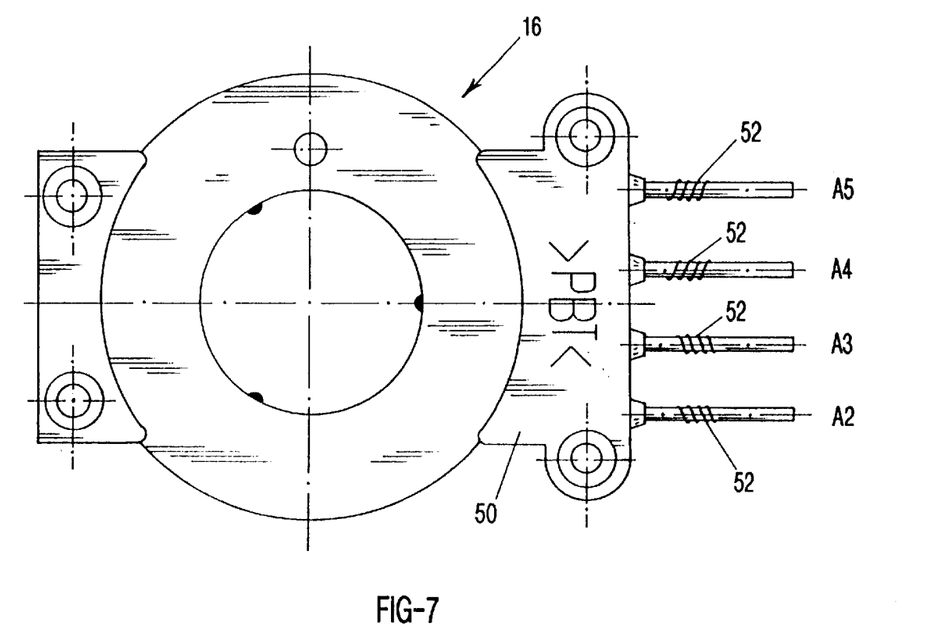
FIG. 7 is a view of the annular coil in the direction of arrow VII according to FIG. 5.
Figure 8:
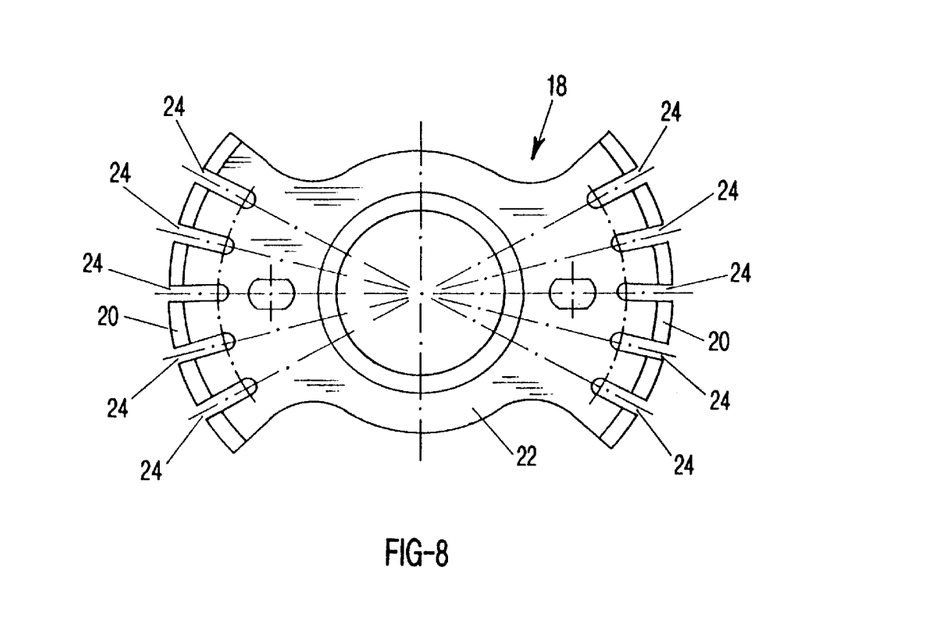
FIG. 8 is a view of the claw pole plate in the direction of arrow VIII of FIG. 6.

According to FIGS. 6 and 8, the claw poles 20 are advantageously slotted by at least two, especially five, axially extending slots 24. In other words, a number $n \geq 2$ slots is provided. This measure reduces polar jerking and avoids current losses due to eddy currents by interrupting the pole surfaces in which eddy currents would be induced otherwise.

It is advantageous to produce the claw pole plates 18 of a material with low hysteresis. This can be achieved by employing a soft magnetic nickel alloy with 30 to 80% nickel. Especially suitable is a material which is known by the trade name "HYPERM 50". This material has especially low hysteresis losses. The coercive field strength should be in the range of 4 to 10 A/m, especially it should not be greater than 8 A/m.

Figure 9:
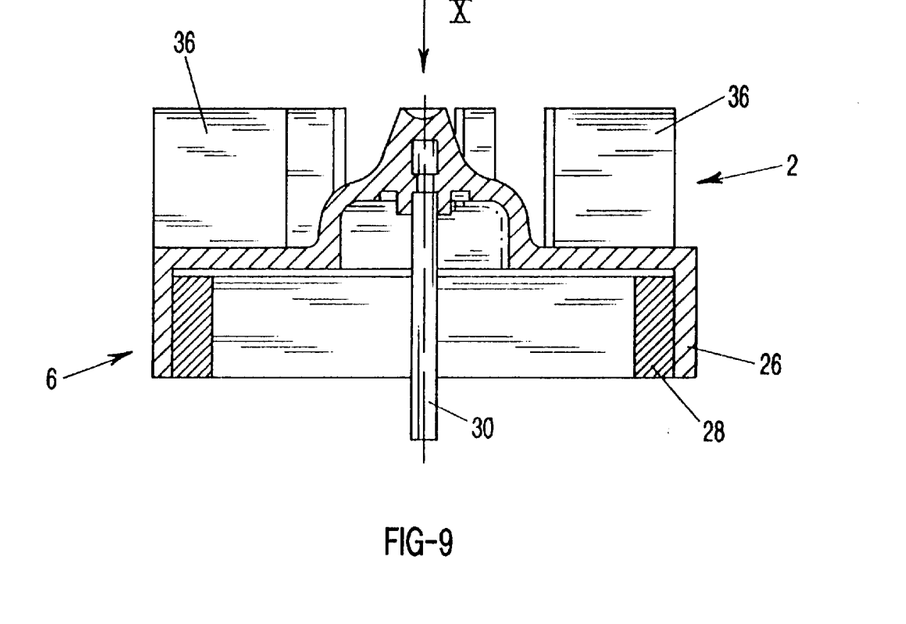
FIG. 9 is an axial section of the rotor/fan wheel unit.

As can be seen from FIGS. 1 and 11, see also FIG. 9, the rotor 6 is in principle an external rotor. It comprises a hollow cylindrical receiving section 26 for an annular permanent magnet rotor 28. This rotor magnet 28 can advantageously be comprised of initially strip-shaped, plastically deformable material such as a plastic material-bonded ferrite magnet with radial magnetization and pole number 4.

Figure 10:
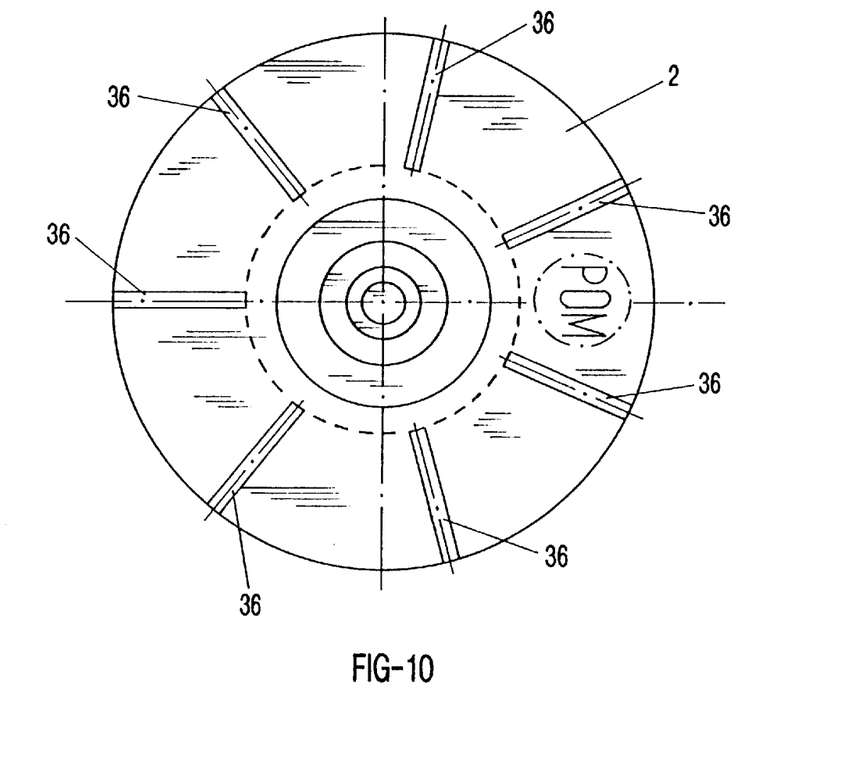
FIG. 10 is a plan view in the axial direction of arrow X according to FIG. 9.

In the represented preferred embodiment, see especially FIGS. 9 and 10, the rotor 6, respectively, the receiving section 26 for the rotor magnet 28, is a monolithic part of the fan wheel 2, expediently a shaped part consisting of plastic material. A shaft 30 is centrally formed therein. According to FIGS. 1 and 11, this shaft 30 is preferably guided in a double slide bearing 32 whereby the free end of the shaft 30, facing away from the rotor 6, is supported in a step bearing 34 in the axial direction. The shaft 30 is running without further axial securing in the slide bearing 32. Securing of the rotor 6 against movement of the shaft 30 out of the slide bearing 32 in the direction away from the step bearing 34 is inventively realized exclusively by magnetic mean. For this purpose, axial spacing V (shown in FIGS. 1 & 11) is provided between the stator 14 and the rotor 6 so that by cooperation of the rotor magnet 28 and the claw poles 20 an axial rotor securing force F is produced. The axial spacing V is selected such as a function of the magnetic conditions that the rotor 6 is subjected to an axial acceleration a which is 4 to 7 times, especially approximately 5 times, the gravitational acceleration g. Thus, a is equal to approximately 5 g. This measure effectively prevents that the essentially unsecured rotor 6 can be moved from its bearing position when subjected to high axial impact, as is, for example, a common event in motor vehicles. Also, these inventive measures will produce only a minimal neglectable noise level. In contrast, other solutions, for example, additional magnets, due to the axial oscillation excitement of the rotor would result in greater and substantially more pronounced noise. In the shown embodiment the axial spacing V between the stator 14 and the rotor 6 is within the range of approximately 40 to 60%, especially approximately 50%, of the axial length of the stator 14 or the rotor magnet 28.

Figure 2:
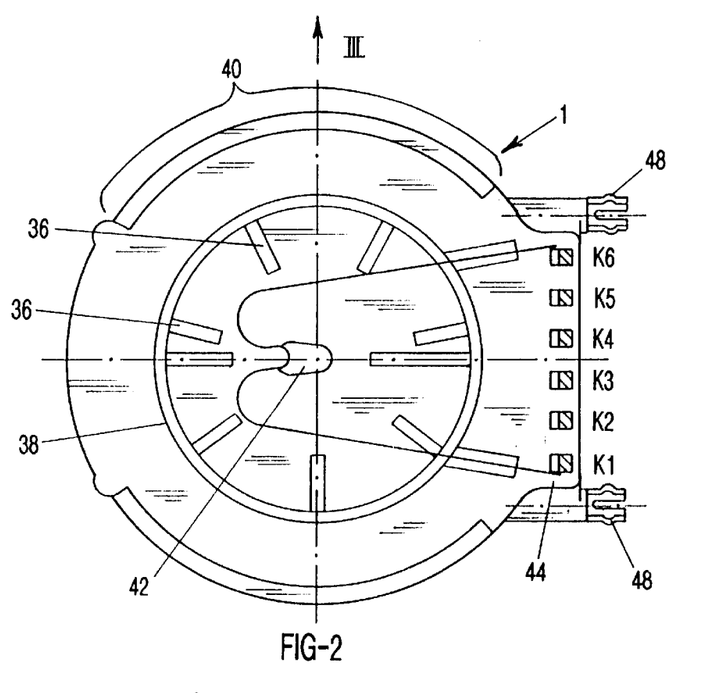
FIG. 2 is a plan view (reduced in size) onto the side of the inlet opening in the direction of arrow II of the FIG. 1.
Figure 3:
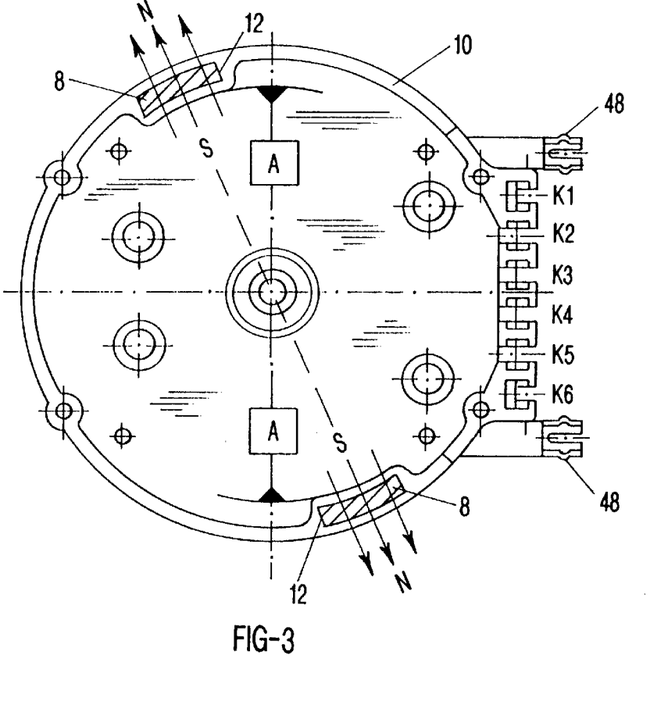
FIG. 3 shows a plan view of the flange side in the direction of arrow III according to FIG. 1.
Figure 4:
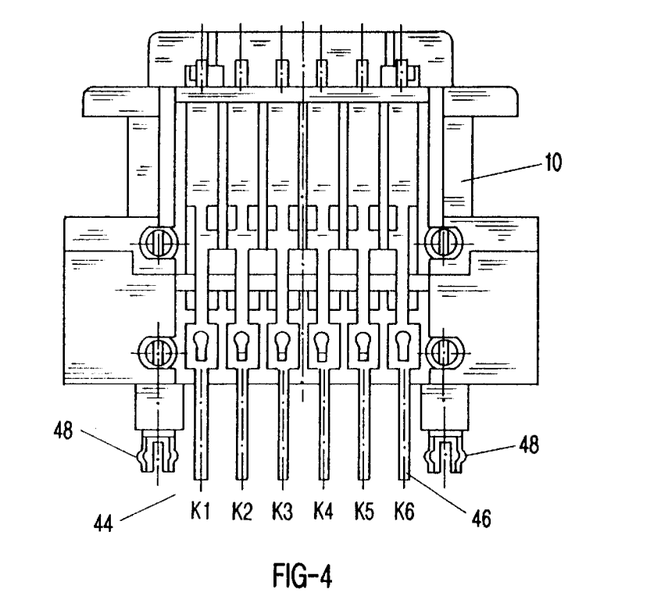
FIG. 4 is a side view in the direction of arrow IV of FIG. 1.
Figure 5:
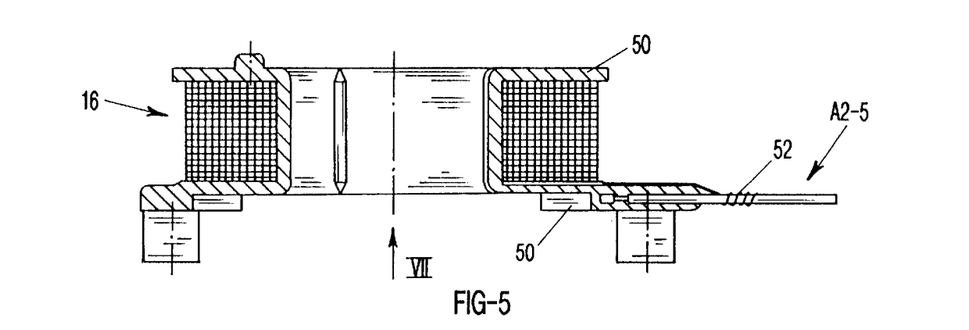
FIG. 5 is an axial section of the annular stator coil.
Figure 12:
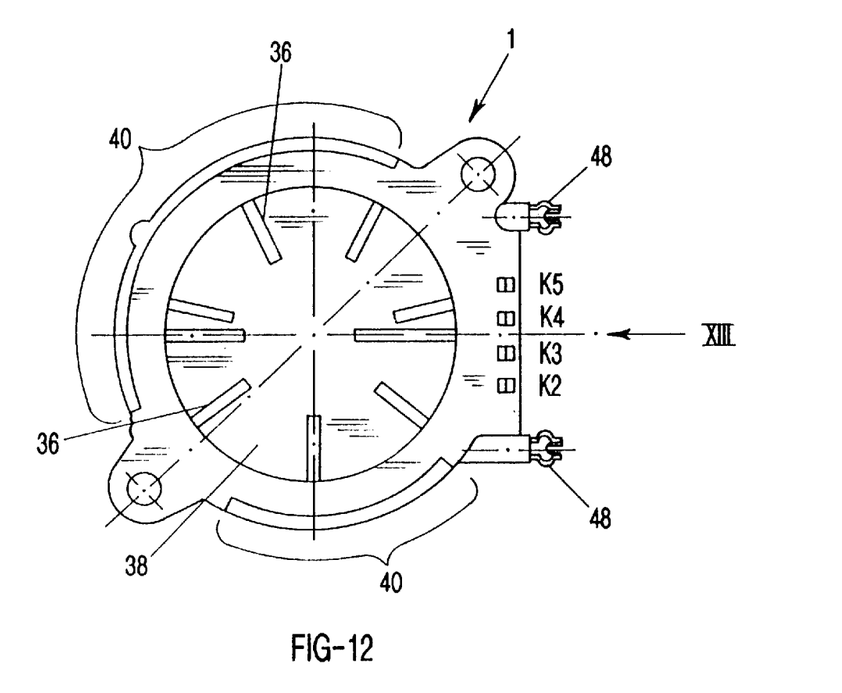
FIG. 12 is a plan view (reduced in size) in the direction of arrow XII of FIG. 1.
Figure 13:
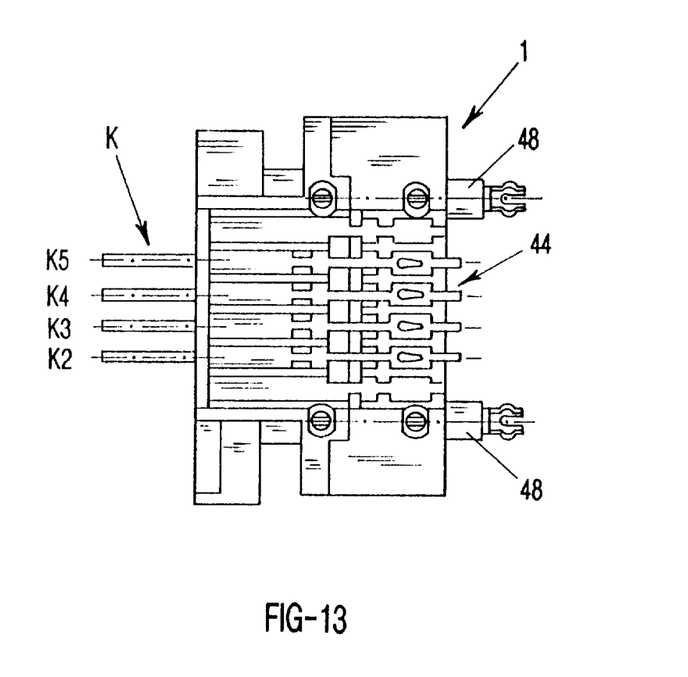
FIG. 13 is a side view (reduced in size) in the direction of arrow XIII of FIG. 12.

As can be seen especially from FIGS. 2, 9 and 10, the fan wheel 2 is preferably a radial wheel with substantially radially arranged vanes 36. These vanes 36 are a unitary part of a planar bottom of the receiving section 26 for the rotor magnet 28. The housing 10, according to FIGS. 1 and 2, or FIGS. 11 and 12, comprises an axial intake opening 38 as well as a radial outlet opening 40. The outlet angle of the outlet opening 40 is variable. For example, it may extend over the entire circumference of the fan as can be seen in FIG. 12 by thick dashed lines.

In the case of the embodiment according to FIGS. 1 through 4, the air flow cross section of the intake opening 38 has arranged there at an electrical temperature sensor 42 which is especially embodied as a NTC sensor. In a preferred embodiment of the inventive mini-fan unit 1, the temperature sensor 42 is a component of the control unit for the air conditioning, for example, of a motor vehicle.

In a preferred embodiment of the invention the mini-fan unit 1 has a special connecting device 44 for electrically connecting the stator 14, i.e., for connecting its annular coil, respectively, the working coil and the sensor coil, as well as preferably connecting the temperature sensor 42. The connecting device 44 comprises, on the one hand, a contact array K with multiple contact elements K1 though K6 (FIGS. 1 though 4), respectively, K2 through K5 (FIGS. 11 through 13) which can be used selectively, for example, by bending into the respective connecting position. According to FIG. 4 the contact elements K1 through K6 extend parallel to one another and to the axis of the rotor (shaft 30). The contact elements K have terminals 46 at the flange side opposite the intake opening 38 which are directly soldered to the printed circuit board. These terminals 46 can advantageously be bent into at least two different positions, for example, on the one hand, into the represented axis-parallel flange side or into the 90° position shown in FIG. 1 to the right. In this manner, the inventive mini-fan unit can be fastened directly in at least two different arrangements, for example, onto a printed circuit board. Preferably, additional holders 48 are provided which are to introduced into respective openings of, for example, a printed circuit board, especially by a snap connection.

The connecting device 44 comprises on the other hand preferably four connecting pins A2 through A5 which are secured in a coil support 50 of the annular coil 16 of the stator 14. The coil support 50 is preferably a shaped plastic part. As can be seen especially from FIG. 7, the coil wire ends 52 of the two annular coils are electrically connected to the connecting pins A2 through A5 and are expediently connected by winding about the pins A2 to A5 or soldering or welding. Furthermore, the connecting pins A2 through A5 are connected with contact elements K2 though K5 of the contact array K, especially by a plug connection. The connecting pins A2 though A5 extend parallel to one another and perpendicular to the axis of the rotor and to the contact elements of the contact array K. The two outer contact elements K1 and K6 of the embodiment of FIGS. 1 though 4 serve as a direct connection to the connecting wires of the temperature sensor 42.

The inventive mini-fan unit 1 is suitable especially for use as a printed circuit board fan, i.e., for a direct arrangement on a circuit board and thus for cooling the surrounding electrical or electronic components. Alternatively, or additionally, the mini-fan unit 1 can be used as a sensor fan in connection with air conditioning controls.

In a practically realized embodiment, the inventive mini-fan unit 1 has the following dimensions, which, however, are to be considered as an example only and are not limiting:

| | | |
|---|---|---|
| Axial Height | | appr. 18 to 25 mm |
| Outer Diameter | | appr. 30 mm |
| Fan Wheel Diameter | | appr. 24 mm |
| Axial Length of Fan Wheel | | appr. 6 mm |
| Inner Diameter of Vane Arrangement | | appr. 12 mm |
| Diameter of Intake Opening | | appr. 18 to 22 mm |
| Outer Diameter of Rotor | | appr. 23 to 25 mm |
| Radial Thickness of Rotor Magnet | | appr. 1.5 to 2.0 mm |
| Axial Length of Rotor Magnet | | appr. 4 to 5 mm |
| Positioning Magnet | | 5 × 3 × 1 mm |
| Rotor Magnet made of Bent Strip | | 60.5 × 4.5 × 1.8 mm |
| Rotor Shaft Length | | 13 to 14 mm |
| Spool Support | Inner Diameter | appr. 7 to 8 mm |
| | Outer Diameter | appr. 15 mm |
| | Axial Length | appr. 5 to 6 mm |
| Annular Coil | 2 coils of appr. 770 windings with appr. 140 to 150 Ω. | |

The specification incorporates by reference the disclosure of German priority document 297 18 082.7 of Oct. 11,1997.

The present invention is, of course, in no way restricted to the specific disclosure of the specification and drawings, but also encompasses any modifications within the scope of the appended claims.

What is claimed is:

1. A mini-fan unit comprising:
   a collectorless dc motor (4);
   a fan wheel (2) driven by said dc motor (4);
   wherein said dc motor (4) is a single phase, single core claw pole motor having a back iron free permanent magnet rotor (6);
   at least one positioning magnet (8) defining a starting position of said dc motor (4);
   wherein said rotor (6) and said stator (14) are spaced at an axial spacing (V) to one another for generating an axial rotor securing force (F).

2. A mini-fan unit according to claim 1, wherein said dc motor (4) comprises a stator (14) having a toroidal coil (16) and two axially spaced claw pole plates (18) each having at least one claw pole (20).

3. A mini-fan unit according to claim 2, wherein each one of said claw pole plates (18) has two of said claw poles (20).

4. A mini-fan unit according to claim 2, wherein said toroidal coil (16) is bifilar and has a first wire and a second wire, wherein said first wire is a working coil and said second wire is a sensing coil, said stator (14) further comprising a control circuit, wherein said control circuit controls by a mono-pulse control said working coil based on rotor position-induced signals sent by said sensing coil to said control circuit.

5. A mini-fan unit according to claim 2, wherein said claw poles (20 are slotted by at least two slots (24).

6. A mini-fan unit according to claim 2, wherein said claw pole plates (18) are comprised of a material having a low hysteresis.

7. A mini-fan unit according to claim 6, wherein said material having said low hysteresis is a soft magnetic nickel iron alloy containing 30% to 80% of nickel.

8. A mini-fan unit according to claim 2, wherein said claw pole plates (18) are comprised of a material having a coercive field strength in the range of 4 A/m to 10 A/m.

9. A mini-fan unit according to claim 2, wherein said rotor (6) is an external rotor having a cylindrical recess (26) for an annular permanent magnetic rotor magnet (28).

10. A mini-fan unit according to claim 9, wherein said rotor magnet (28) is a ferrite magnet that is plastically deformable.

11. A mini-fan unit according to claim 9, wherein said rotor magnet (28) is comprised of a ferrite material embedded in a plastic material.

12. A mini-fan unit according to claim 9, wherein said at least one positioning magnet (8) is positioned centrally relative to an axial height of said rotor magnet (28).

13. A mini-fan unit according to claim 2, further comprising an electric connecting device (44) for electrically connecting said stator (14).

14. A mini-fan unit according to claim 13, wherein said electrical connecting device (44) comprises an array of electrical contacting elements (K1–K6),wherein said contacting elements (K1–K6) are selectively used and bendable into a required contacting position.

15. A mini-fan unit according to claim 13, wherein said toroidal coil (16) has a support (5) comprising connecting terminals (A2–A5), wherein wire ends of said toroidal coil (16) are electrically connected to said connecting terminals (A2–A5) and wherein each one of said connecting terminals (A2–A5) is connected to one of said contacting element (K2–K5).

16. A mini-fan unit according to claim 1, wherein said rotor (6) and said fan wheel (2) together form a monolithic part.

17. A mini-fan unit according to claim 1, wherein said fan wheel (2) has radially arranged vanes (36).

18. A mini-fan unit according to claim 1, comprising a housing (10) in which said fan wheel (2), said dc motor (4), and said at least one positioning magnet (8) are mounted, said housing (10) having an axial air intake opening (38) and a radial air outlet opening (40).

19. A mini-fan unit according to claim 18, wherein said housing has a pocket (12) for each one of said positioning magnets (8).

20. A mini-fan unit according to claim 19, wherein two of said positioning magnets (8) are provided and wherein said pockets (12) are arranged diametrically opposed within said housing (10).

21. A mini-fan unit according to claim 18, further comprising a temperature sensor (42) positioned within an air flow cross-section of said air intake opening (38) or of said air outlet opening (40).

22. A mini-fan unit according to claim 18, further comprising temperature sensors (42) positioned within an air flow cross-section of said air intake opening (38) and of said air outlet opening (40).

23. A mini-fan unit according to claim 1, wherein said axial spacing (V) is selected based on magnetic properties of said rotor (6) and said stator (14) such that said rotor (6) is subjected to an axial acceleration (a) that is four to seven times the gravitational acceleration.

24. A mini-fan unit according to claim 1, wherein said axial spacing (V) is in a range of 40% to 60% of an axial length of said stator (14).

* * * * *

UNITED STATES PATENT AND TRADEMARK OFFICE
CERTIFICATE OF CORRECTION

PATENT NO. : 6,013,966  
DATED : January 11, 2000  
INVENTOR(S) : Wolfgang Fehrenbacher, Motjaba Moini, and Fritz Schmider Page 1 of 1

It is certified that error appears in the above-identified patent and that said Letters Patent is hereby corrected as shown below:

On title page, item [54] should read as follows:

[54] MINI-FAN UNIT ESPECIALLY FOR USE AS A FAN FOR PRINTED CIRCUIT BOARDS

On title page, item [75] should read as follows:

[75] Inventors: Wolfgang Fehrenbacher, Mojtaba Moini, and Fritz Schmider

Signed and Sealed this

Thirty-first Day of July, 2001

Attest:

Attesting Officer

NICHOLAS P. GODICI  
*Acting Director of the United States Patent and Trademark Office*